(12) United States Patent
Mitsunobu et al.

(10) Patent No.: US 12,454,749 B2
(45) Date of Patent: Oct. 28, 2025

(54) PLATED STEEL SHEET

(71) Applicant: NIPPON STEEL CORPORATION, Tokyo (JP)

(72) Inventors: Takuya Mitsunobu, Tokyo (JP); Masaaki Uranaka, Tokyo (JP); Masahiro Matsuba, Tokyo (JP); Toyomitsu Nakamura, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 18/711,221

(22) PCT Filed: Jan. 26, 2023

(86) PCT No.: PCT/JP2023/002439
§ 371 (c)(1),
(2) Date: May 17, 2024

(87) PCT Pub. No.: WO2023/145822
PCT Pub. Date: Aug. 3, 2023

(65) Prior Publication Data
US 2025/0003048 A1    Jan. 2, 2025

(30) Foreign Application Priority Data

Jan. 31, 2022   (JP) .................. 2022-013458

(51) Int. Cl.
*B32B 15/01*   (2006.01)
*C22C 18/00*   (2006.01)
(Continued)

(52) U.S. Cl.
CPC ............ *C23C 2/405* (2013.01); *B32B 15/012* (2013.01); *B32B 15/013* (2013.01); *C22C 18/00* (2013.01);
(Continued)

(58) Field of Classification Search
None
See application file for complete search history.

(56) References Cited

U.S. PATENT DOCUMENTS

| 11,634,790 B2* | 4/2023 | Mitsunobu | C23C 2/40 |
| | | | 428/629 |
| 2020/0002798 A1 | 1/2020 | Tokuda et al. | |

(Continued)

FOREIGN PATENT DOCUMENTS

| EP | 1 225 246 B1 | 5/2011 |
| WO | WO 2018/139620 A1 | 8/2018 |

(Continued)

*Primary Examiner* — Daniel J. Schleis
(74) *Attorney, Agent, or Firm* — Birch, Stewart, Kolasch & Birch, LLP

(57) ABSTRACT

To more reliably suppress LME and blowhole formation while maintaining excellent corrosion resistance.

A plated steel sheet according to the present invention, includes: a steel sheet as a base material; a plating layer located on at least part of a surface of the steel sheet; and an oxide layer located on a surface of the plating layer, where a chemical composition of the plating layer is made up of prescribed components, and Zn and impurities as the balance, and when a position at a depth of 5 nm from an uppermost surface of the oxide layer is observed by X-ray photoelectron spectroscopy (XPS), a value of an intensity ratio ($[Al-O]+[Mg-O])/[Zn-O]$) calculated from intensity of peaks respectively attributed to an Al—O bond, an Mg—O bond, and a Zn—O bond is 5.0 or more.

9 Claims, 2 Drawing Sheets

(51) Int. Cl.
  *C22C 18/04* (2006.01)
  *C22C 21/02* (2006.01)
  *C22C 21/08* (2006.01)
  *C22C 21/10* (2006.01)
  *C22C 30/06* (2006.01)
  *C22C 38/02* (2006.01)
  *C22C 38/04* (2006.01)
  *C23C 2/02* (2006.01)
  *C23C 2/04* (2006.01)
  *C23C 2/06* (2006.01)
  *C23C 2/12* (2006.01)
  *C23C 2/20* (2006.01)
  *C23C 2/40* (2006.01)
  *C23C 30/00* (2006.01)

(52) U.S. Cl.
  CPC .............. *C22C 18/04* (2013.01); *C22C 21/02* (2013.01); *C22C 21/08* (2013.01); *C22C 21/10* (2013.01); *C22C 30/06* (2013.01); *C22C 38/02* (2013.01); *C22C 38/04* (2013.01); *C23C 2/0222* (2022.08); *C23C 2/0224* (2022.08); *C23C 2/04* (2013.01); *C23C 2/06* (2013.01); *C23C 2/12* (2013.01); *C23C 2/20* (2013.01); *C23C 2/40* (2013.01); *C23C 30/00* (2013.01)

(56) References Cited

U.S. PATENT DOCUMENTS

| | | |
|---|---|---|
| 2021/0039354 A1 | 2/2021 | Tokuda et al. |
| 2022/0145425 A1 | 5/2022 | Mitsunobu et al. |
| 2023/0193443 A1 | 6/2023 | Mitsunobu et al. |

FOREIGN PATENT DOCUMENTS

| | | |
|---|---|---|
| WO | WO 2019/180852 A1 | 9/2019 |
| WO | WO 2020/213686 A1 | 10/2020 |
| WO | WO 2021/171514 A1 | 9/2021 |

\* cited by examiner

PLATED STEEL SHEET

TECHNICAL FIELD

The present invention relates to a plated steel sheet.

BACKGROUND ART

A galvanized steel sheet is a widely used material in construction, automobiles, and other fields to improve corrosion resistance of structural members. In this case, various structural members are manufactured by welding galvanized steel sheets, which have been galvanized in advance, by arc welding, laser welding, or other welding methods.

One of the problems unique to the manufacture of the structural members by welding galvanized steel sheets is degradation of corrosion resistance around a weld zone (weld heat-affected zone) due to liquid metal embrittlement (LME) cracking caused by hot-dip plating in a heat-affected zone of a weld metal and base material and blowhole formation caused by Zn evaporation during welding.

To solve the above problems of LME and blowhole formation, various proposals have been made in the past. For example, in Patent Document 1 below, a plated steel material is proposed, the plated steel material includes: a steel sheet and a plating layer located on a surface of the steel sheet and including a Zn—Al—Mg alloy layer, wherein in a cross-section of the Zn—Al—Mg alloy layer, an area fraction of an $MnZn_2$ phase is 45 to 75%, a total area fraction of an $MgZn_2$ phase and an Al phase is 70% or more, and an area fraction of a Zn—Al—$MgZn_2$ ternary eutectic structure is 0 to 5%, and the plating layer has a predetermined chemical composition.

PRIOR ART DOCUMENT

Patent Document

Patent Document 1: International Publication Pamphlet No. WO 2018/139620

DISCLOSURE OF THE INVENTION

Problems to be Solved by the Invention

Here, the problems of the LME and blowhole formation can be solved by using the plated steel material proposed in Patent Document 1 above. However, the inventors have found that there is still room for improvement in the technology proposed in Patent Document 1 above, and that further improvement can be expected for the problems of the LME and blowhole formation.

The present invention was made in view of the above problems, and an object thereof is to provide a plated steel sheet that can more reliably suppress the LME and blowhole formation while maintaining excellent corrosion resistance.

Means for Solving the Problems

To solve the above problems, the present inventors have studied the above problems and found that when an oxide layer formed on a surface of a zinc-based plating layer can be made more dense, the occurrence of the LME and blowhole formation can be more reliably suppressed while maintaining excellent corrosion resistance, and thus the present invention was completed.

The gist of the invention completed based on such findings is as follows.

(1) A plated steel sheet, including: a steel sheet as a base material, a plating layer located on at least part of a surface of the steel sheet, and an oxide layer located on a surface of the plating layer, wherein the plating layer contains: by mass %, Al: 1.00 to 80.00%, Mg: 1.00 to 20.00%, Fe: 0.01 to 15.00%, Si: 0 to 10.00%, Ca: 0 to 4.00%, and further selectively contains 0 to 5.000% in total of: Sb: 0 to 0.500%, Pb: 0 to 0.500%, Cu: 0 to 1.000%, Sn: 0 to 1.000%, In: 0 to 1.000%, Bi: 0 to 1.000%, Ti: 0 to 1.000%, Cr: 0 to 1.000%, Nb: 0 to 1.000%, Zr: 0 to 1.000%, Ni: 0 to 1.000%, Mn: 0 to 1.000%, V: 0 to 1.000%, Mo: 0 to 1.000%, Ag: 0 to 1.000%, Li: 0 to 1.000%, La: 0 to 0.500%, Ce: 0 to 0.500%, B: 0 to 0.500%, Y: 0 to 0.500%, Sr: 0 to 0.500%, with the balance composed of 5.00 mass % or more Zn and impurities, and when a position at a depth of 5 nm from an uppermost surface of the oxide layer is observed by X-ray photoelectron spectroscopy (XPS), a value of an intensity ratio ([Al—O]+[Mg—O])/[Zn—O]) calculated from intensity of peaks respectively attributed to an Al—O bond, an Mg—O bond, and a Zn—O bond is 5.0 or more.

(2) The plated steel sheet according to (1), wherein the value of the intensity ratio ([Al—O]+[Mg—O])/[Zn—O] is 10.0 or more.

(3) The plated steel sheet according to (1) or (2), wherein the plating layer contains at least Al: 18.00 to 60.00 mass % and Mg: 5.00 to 15.00 mass %.

(4) The plated steel sheet according to any one of (1) to (3), wherein the plating layer contains at least Al: 35.00 to 60.00 mass % and Mg: 7.00 to 15.00 mass %, an $Mg_{32}(Al, Zn)_{49}$ phase is present in the plating layer and an Mg content [Mg], Zn content [Zn], and Al content [Al] (each unit: atom %) in the $Mg_{32}(Al, Zn)_{49}$ phase satisfy the relationship of $0.50 \leq [Mg]/([Zn]+[Al]) \leq 0.83$.

Effect of the Invention

As explained above, the present invention enables more reliable suppression of LME and blowhole formation in plated steel sheets while maintaining excellent corrosion resistance.

EMBODIMENTS FOR CARRYING OUT THE INVENTION

The following is a detailed description of a preferred embodiment of the present invention with reference to the accompanying drawings. In this specification and drawings, components that have substantially the same functional configuration will be omitted from duplicated explanation by applying the same codes.

(Plated Steel Sheet)

Figure 1A:
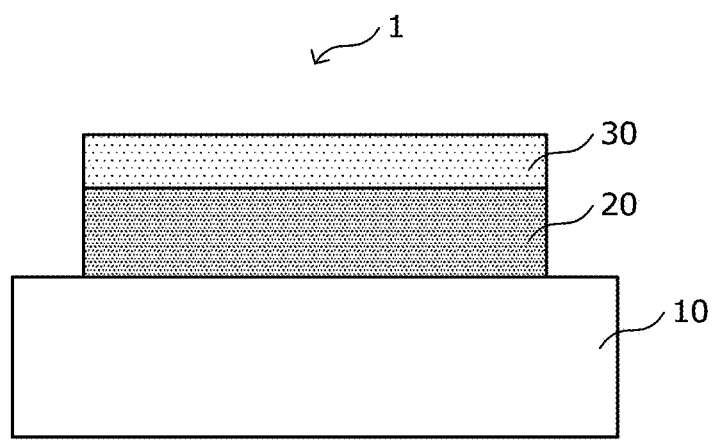
FIG. 1A is an explanatory diagram schematically illustrating an example of a plated steel sheet according to an embodiment of the present invention.
Figure 1B:
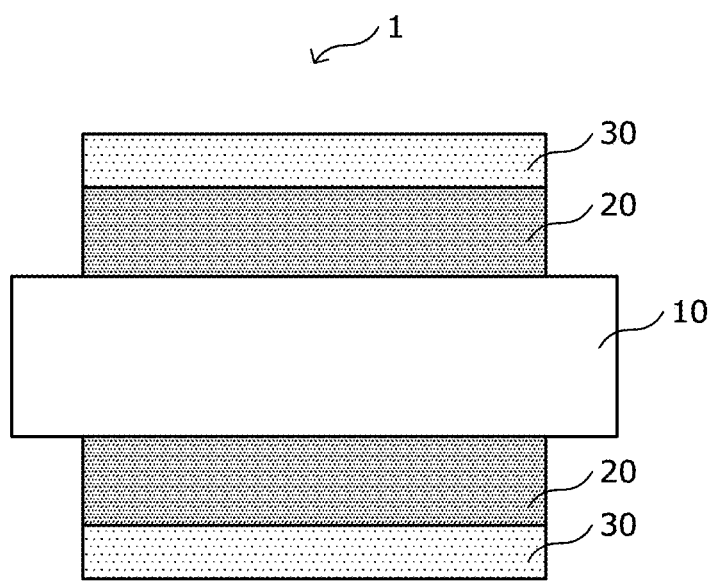
FIG. 1B is an explanatory diagram schematically illustrating an example of the plated steel sheet according to the embodiment.

First, an overall configuration of a plated steel sheet of an embodiment of the present invention will be explained with reference to FIG. 1A and FIG. 1B. FIG. 1A and FIG. 1B are explanatory diagrams schematically illustrating an example of a plated steel sheet according to this embodiment.

As schematically illustrated in FIG. 1A, a plated steel sheet 1 of this embodiment includes a steel sheet 10 as a base material, a plating layer 20 located on at least part of a surface of the steel sheet 10, and an oxide layer 30 located on a surface of the plating layer 20. Such plating layer 20 and oxide layer 30 may be present on both surfaces of the steel sheet 10, as schematically illustrated in FIG. 1B, instead of only on one surface of the 15 steel sheet 10 as illustrated in FIG. 1A.

<Steel Sheet 10>

The steel sheet 10 used as the base material of the plated steel sheet 1 of this embodiment is not limited, and various steel sheets can be used depending on mechanical strength (for example, tensile strength) and other strengths required for the plated steel sheet 1. Examples of such steel sheets 10 include, for example, various types of steel sheets such as various types of Al-killed steel, ultralow carbon steel containing Ti, Nb, and the like, and high-strength steel further containing strengthening elements such as P, Si, and Mn in the ultralow carbon steel, and other steels.

A thickness of the steel sheet 10 is not limited and should be set appropriately according to the mechanical strength, and the like required for the plated steel sheet 1.

<Plating Layer 20>

The plating layer 20 is provided on at least part of the surface of the steel sheet 10, as schematically illustrated in FIG. 1A and FIG. 1B, and is more preferably provided over an entire surface of the steel sheet 10. In the following, a chemical composition of such plating layer 20 is first described in detail.

Chemical Composition of Plating Layer 20

As the chemical composition, the plating layer 20 of this embodiment contains, by mass %, Al: 1.00 to 80.00%, Mg: 1.00 to 20.00%, Fe: 0.01 to 15.00%, Si: 0 to 10.00%, Ca: 0 to 4.00%, with the balance composed of 5.00 mass % or more Zn and impurities. In other words, in the chemical composition of the plating layer 20 of this embodiment, contents of Al, Mg, Fe, Si, and Ca are within the above ranges and the sum of these contents is less than 100 mass %, with the balance composed of 5.00 mass % or more Zn and impurities.

These components and their contents are described in detail below.

[Al: 1.00 to 80.00 Mass %]

Al is an element necessary to constitute a main phase (Zn—Al—Mg-based alloy phase) of the plating layer 20 of this embodiment. Al is contained in a predetermined content or more to ensure corrosion resistance of portions to be a weld heat-affected zone and a non-weld zone, as a plated steel sheet. When an Al content in the plating layer 20 is less than 1.00 mass %, the corrosion resistance of the portions to be the weld heat-affected zone and the non-weld zone cannot be ensured as described above. Therefore, in the plating layer 20 of this embodiment, the Al content is 1.00 mass % or more. The Al content is preferably 18.00 mass % or more, and more preferably 35.00 mass % or more. The corrosion resistance of the plated steel sheet 1 can be ensured by the Al content in the above range.

On the other hand, when the Al content in the plating layer 20 exceeds 80.00 mass %, an Al phase, which functions as a cathode when placed in a corrosive environment, increases excessively, and the corrosion of base iron is likely to proceed, thus the corrosion resistance of the plated steel sheet 1 cannot be ensured. Therefore, in the plating layer 20 of this embodiment, the Al content is 80.00 mass % or less. The Al content is preferably 60.00 mass % or less, more preferably 50.00 mass % or less.

[Mg: 1.00 to 20.00 Mass %]

Mg is an element necessary to constitute the main phase (Zn—Al—Mg-based alloy phase) of the plating layer 20 of this embodiment. Mg is contained in a predetermined content or more to ensure the corrosion resistance of the portions to be the weld heat-affected zone and the non-weld zone, as the plated steel sheet. Therefore, in the plating layer 20 of this embodiment, an Mg content is 1.00 mass % or more. The Mg content is preferably 5.00 mass % or more, and more preferably 7.00 mass % or more. The corrosion resistance of the plated steel sheet 1 can be ensured by the Mg content in the above range.

On the other hand, when the Mg content in the plating layer 20 exceeds 20.00 mass %, anodic dissolution of the plating layer is likely to proceed when placed in the corrosive environment, and the corrosion resistance of the plated steel sheet 1 cannot be ensured. Therefore, in the plating layer 20 of this embodiment, the Mg content is 20.00 mass % or less. The Mg content is preferably 15.00 mass % or less, and more preferably 13.00 mass % or less. The corrosion resistance of the plated steel sheet 1 can be ensured by the Mg content in the above range.

[Fe: 0.01 to 15.00 Mass %]

Elements constituting the steel sheet 10, which is the base material, may be sometimes mixed into the plating layer 20. Especially in a hot-dip plating method, the elements constituting the steel sheet 10 are easily mixed into the plating layer 20 due to interdiffusion of the elements by solid-liquid reaction between the steel sheet 10 and the plating layer 20. Due to such mixing of the elements, a predetermined amount of Fe is contained in the plating layer 20, and the content is generally 0.01 mass % or more. When the above interdiffusion is promoted, adhesiveness between the steel sheet 10 and the plating layer 20 is improved. From the perspective of improving the adhesiveness between the steel sheet 10 and the plating layer 20, an Fe content in the plating layer 20 is preferably 0.20 mass % or more.

Fe may be intentionally added to a plating bath used to manufacture the plating layer 20 to the extent that the effect of the present invention is not impaired. However, when the Fe content in the plating layer 20 is 15.00 mass % or more, high melting point intermetallic compounds of Fe and Al are formed in the plating bath, and such high melting point intermetallic compounds adhere to the plating layer as dross and significantly degrades an appearance quality, which is undesirable. From this perspective, the Fe content in the plating bath is adjusted so that the Fe content in the plating layer 20 is 15.00 mass % or less. The Fe content in the plating layer 20 is more preferably 10.00 mass % or less.

[Si: 0 to 10.00 Mass %]

Si is an element capable of suppressing excessive growth of Fe—Al-based intermetallic compounds that are formed at an interface between the plating layer and the steel sheet and improving the adhesiveness between the plating layer and the steel sheet. A Si content is preferably 0.05 mass % or more, and more preferably 0.20 mass % or more to suppress the excessive growth of the Fe—Al-based intermetallic compounds. On the other hand, when the Si content exceeds 10.00 mass %, it is difficult to suppress Zn evaporation when such plated steel sheet is welded because an excessive amount of intermetallic compound with high melting point is formed with Mg and the formation of an Al—Mg oxide film with Zn evaporation suppression effect is inhibited.

On the other hand, when the Si content in the plating bath for manufacturing the plating layer 20 is too high, viscosity of the plating bath may increase more than necessary, and plating operability may decrease. Therefore, the Si content in the plating bath is adjusted from the perspective of plating operability, and the Si content in the plating layer 20 is preferably 5.00 mass % or less, and more preferably 2.00 mass % or less.

[Ca: 0 to 4.00 Mass %]

When Ca is contained in the plating layer 20, it forms intermetallic compounds with Al and Zn. Furthermore, when Si is contained together with Ca in the plating layer 20, Ca forms intermetallic compound phases with Si. These intermetallic compounds have a high melting point and a stable structure, which can suppress blowhole formation caused by Zn evaporation during welding of the plated steel sheet and LME. Such a suppression effect of blowhole formation and LME during welding is achieved when a Ca content is 0.01 mass % or more. The Ca content in the plating layer 20 is more preferably 0.10 mass % or more.

On the other hand, when the Ca content in the plating layer 20 exceeds 4.00 mass %, corrosion resistance of the plated steel sheet will decrease. From this perspective, the Ca content in the plating layer 20 is 4.00 mass % or less. The Ca content in the plating layer 20 is preferably 2.50 mass % or less, and more preferably 1.50 mass % or less.

In the plating layer 20, the balance of the above Al, Mg, Fe, Si, and Ca is 5.00 mass % or more Zn and impurities.

Zn is an element necessary to constitute the main phase (Zn—Al—Mg-based alloy phase) of the plating layer 20 of this embodiment and is an important element to improve the corrosion resistance of the plated steel sheet. When the plating layer 20 contains the above Al, Mg, Fe, Si, and Ca within the above ranges and also contains 5.00 mass % or more Zn, the LME and blowhole formation during welding can be suppressed.

In addition, the plating layer 20 of this embodiment may further selectively contain 0 to 5.000% in total of Sb: 0 to 0.500%, Pb: 0 to 0.500%, Cu: 0 to 1.000%, Sn: 0 to 1.000%, In: 0 to 1.000%, Bi: 0 to 1.000%, Ti: 0 to 1.000%, Cr: 0 to 1.000%, Nb: 0 to 1.000%, Zr: 0 to 1.000%, Ni: 0 to 1.000%, Mn: 0 to 1.000%, V: 0 to 1.000%, Mo: 0 to 1.000%, Ag: 0 to 1.000%, Li: 0 to 1.000%, La: 0 to 0.500%, Ce: 0 to 0.500%, B: 0 to 0.500%, Y: 0 to 0.500%, and Sr: 0 to 0.500%, instead of part of Zn as the balance. In other words, the plating layer 20 of this embodiment may contain at least any element of Sb, Pb, Cu, Sn, In, Bi, Ti, Cr, Nb, Zr, Ni, Mn, V, Mo, Ag, Li, La, Ce, B, Y, and Sr as optional additive elements within the above content ranges and the total content of 5.000 mass % or less. Since it is conceivable that the plating layer 20 of this embodiment may not contain any of the optional additive elements as described above, a lower limit of the content of each optional additive element is 0 mass %.

By setting the total content of the above optional additive elements to 5.000 mass % or less, it is possible to enjoy the effects achieved by the addition of each optional additive element, as described in detail below, without impairing each other. The total content of the above optional additive elements is preferably 1.000 mass % or less, and more preferably 0.200 mass % or less.

The content of each optional additive element is described in detail below.

[Sb: 0 to 0.500 Mass %]
[Pb: 0 to 0.500 Mass %]
[Sr: 0 to 0.500 Mass %]

When at least any of Sb, Pb, and Sr is contained in the plating layer 20, spangles are formed on the surface of the plating layer 20, which improves metallic luster. Therefore, from the perspective of improving design of the plated steel sheet, at least any of Sb, Pb, and Sr is preferably contained in the plating layer 20. Such a design improvement effect is achieved when the content of at least any of Sb, Pb, and Sr is 0.050 mass % or more. Therefore, when at least any of Sb, Pb, and Sr is contained in the plating layer 20, the content of each of these elements should be independently 0.050 mass % or more.

On the other hand, when forming the plating layer 20 in which any of the contents of Sb, Pb, and Sr exceeds 0.500 mass %, an amount of dross generated in the plating bath used to form the plating layer 20 increases, and a plated steel sheet with good plating properties cannot be manufactured. Therefore, the content of each of Sb, Pb, and Sr in the plating layer 20 is independently 0.500 mass % or less, and preferably 0.200 mass % or less.

[Cu: 0 to 1.000 Mass %]
[Ti: 0 to 1.000 Mass %]
[Cr: 0 to 1.000 Mass %]
[Nb: 0 to 1.000 Mass %]
[Ni: 0 to 1.000 Mass %]
[Mn: 0 to 1.000 Mass %]
[V: 0 to 1.000 Mass %]

When at least any of Cu, Ti, Cr, Nb, Ni, Mn, and V is contained in the plating layer 20, these elements are incorporated into the Al—Fe alloy phase formed by welding when such plated steel sheet is welded, and the corrosion resistance of the weld zone formed can be improved. Such an effect of improving the corrosion resistance of the weld zone is achieved when the content of any of Cu, Ti, Cr, Nb, Ni, Mn, and V in the plating layer 20 is 0.005 mass % or more. Therefore, when at least any of Cu, Ti, Cr, Nb, Ni, Mn, and V is contained in the plating layer 20, the content of each of these elements is preferably 0.005 mass % or more, independently.

On the other hand, when forming the plating layer 20 in which any of the contents of Cu, Ti, Cr, Nb, Ni, Mn, and V exceeds 1.000 mass %, these elements form various intermetallic compounds in the plating bath to form the plating layer 20, causing the viscosity of the plating bath to increase and making it impossible to manufacture a plated steel sheet with good plating properties. Therefore, the content of each of Cu, Ti, Cr, Nb, Ni, Mn, and V in the plating layer 20 is independently 1.000 mass % or less, and preferably 0.200 mass % or less.

[Sn: 0 to 1.000 Mass %]
[In: 0 to 1.000 Mass %]
[Bi: 0 to 1.000 Mass %]

Sn, In, and Bi are elements that increase an Mg dissolution rate when the plating layer 20 containing Zn, Al, and Mg is placed in the corrosive environment. When the Mg dissolution rate increases, Mg ions are supplied to exposed portions of the steel sheet 10, and the corrosion resistance is improved. From this perspective, when Sn, In, and Bi are contained, the content of each of Sn, In, and Bi is independently 0.0050 mass % or more. On the other hand, excessive addition of Sn, In, and Bi may excessively accelerate the Mg dissolution rate and reduce the corrosion resistance of the plated steel sheet. The content of each of Sn, In, and Bi is independently 1.000 mass % or less because such an increase in the Mg dissolution rate becomes more pronounced when any of the contents of Sn, In, and Bi exceeds 1.000 mass %. The content of each of Sn, In, and Bi is preferably 0.200 mass % or less, independently.

[Zr: 0 to 1.000 Mass %]

When Zr is contained in the plating layer 20, the plating operability can be improved. Such an effect of improved plating operability is achieved when a Zr content is 0.010 mass % or more. Therefore, when Zr is contained, the content is preferably set to 0.010 mass % or more.

On the other hand, when forming the plating layer 20 in which the Zr content exceeds 1.000 mass %, a large amount of dross is likely to be generated in the plating bath used to form the plating layer 20. Therefore, the content of Zr is 1.000 mass % or less, and preferably 0.100 mass % or less.

[Mo: 0 to 1.000 Mass %]

When Mo is contained in the plating layer 20, the corrosion resistance can be improved. Such an effect of improved corrosion resistance is achieved when an Mo content is 0.010 mass % or more. Therefore, when Mo is contained, the content is preferably 0.010 mass % or more.

On the other hand, when forming the plating layer 20 in which the Mo content exceeds 1.000 mass %, it causes a large amount of dross generated in the plating bath used, which is undesirable. Therefore, the Mo content is 1.000 mass % or less, and preferably 0.050 mass % or less.

[Ag: 0 to 1.000 Mass %]

When Ag is contained in the plating layer 20, the plating operability can be improved. Such an effect of improved plating operability is achieved when an Ag content is 0.010 mass % or more. Therefore, when Ag is contained, the content is preferably set to 0.010 mass % or more.

On the other hand, when forming the plating layer 20 in which the Ag content exceeds 1.000 mass %, a large amount of dross is likely to be generated in the plating bath used to form the plating layer 20. Therefore, the Ag content is 1.000 mass % or less, and preferably 0.050 mass % or less.

[Li: 0 to 1.000%]

When Li is contained in the plating layer 20, the plating operability can be improved. Such an effect of improved plating operability is achieved when a Li content is 0.010 mass % or more. Therefore, when Li is contained, the content is preferably set to 0.010 mass % or more.

On the other hand, when forming the plating layer 20 in which the Li content exceeds 1.000 mass %, a large amount of dross is likely to be generated in the plating bath used to form the plating layer 20. Therefore, the Li content is 1.000 mass % or less, and preferably 0.050 mass % or less.

[La: 0 to 0.500 Mass %]
[Ce: 0 to 0.500 Mass %]
[Y: 0 to 0.500 Mass %]

La, Ce, and Y are elements that achieve almost the same effect as Ca in suppressing the blowhole formation during welding. This is because an atomic radius of each element is close to that of Ca. When these elements are contained in the plating layer 20, they replace a Ca position. Therefore, these elements are detected at the same position as Ca in EDS. Even when these elements become oxides after welding the plated steel sheet, the oxides of these elements are detected at the same position as CaO.

Such a suppression effect of the blowhole formation during welding is achieved when the content of each of these elements is independently 0.010 mass % or more. Therefore, each of the La, Ce, and Y contents in the plating layer 20 is more preferably 0.050 mass % or more, independently.

On the other hand, when the La, Ce, and Y contents in the plating bath for manufacturing the plating layer 20 are too high, the viscosity of the plating bath may increase more than necessary and the plating operability may decrease. Therefore, the La, Ce, and Y contents in the plating bath are adjusted from the perspective of the plating operability, so that each of the La, Ce, and Y contents is 0.500 mass % or less, independently. Each of the La, Ce, and Y contents is more preferably 0.100 mass % or less, independently.

[B: 0 to 0.500 Mass %]

When B is contained in the plating layer 20, the effect of further suppressing LME is obtained. This is presumably because when B is contained in the plating layer 20, B forms various intermetallic compound phases by combining with at least any of Zn, Al, Mg, and Ca. The presence of B in the plating layer 20 is also considered to have the effect of further suppressing the LME of the steel sheet 10 by diffusing B from the plating layer 20 into the steel sheet 10 and strengthening grain boundary. Furthermore, the various intermetallic compounds formed with respect to B are presumably also effective in suppressing the Zn evaporation during welding because of their extremely high melting points. These improvement effects are achieved when B is contained 0.050 mass % or more. Therefore, a B content in the plating layer 20 is more preferably 0.050 mass % or more.

On the other hand, when B is excessively contained in the plating bath so that B is contained in the plating layer 20, a plating melting point increases rapidly, resulting in a decrease in the plating operability, and plated steel sheets with excellent plating properties cannot be manufactured. Such a decrease in the operability is more pronounced when the B content exceeds 0.500 mass %, so the B content should be 0.500 mass % or less. The B content is preferably 0.100 mass % or less.

[Measurement Method of Chemical Component]

The chemical component of the above plating layer 20 can be measured using ICP-AES (inductively coupled plasma atomic emission spectrometry) or ICP-MS (inductively coupled plasma mass spectrometry). ICP-AES shall be used for analysis of chemical components up to 0.1 mass % units, and ICP-MS shall be used for analysis of chemical components in trace amounts of less than 0.1 mass %. The plated steel sheet is immersed in a 10% HCl aqueous solution with an inhibitor for about 1 minute to peel off the plating layer, and the solution dissolving the plating layer is prepared. The obtained solution is analyzed by ICP-AES or ICP-MS to obtain an overall average chemical component of the plating layer.

More Preferred Chemical Composition of Plating Layer 20

The plating layer 20 of this embodiment has the above chemical composition, but the more preferred chemical composition is as follows.

That is, the plating layer 20 of this embodiment more preferably contains at least 18.00 to 60.00 mass % Al and 5.00 to 15.00 mass % Mg as the chemical composition and further contains optional additive elements as described above if necessary.

The plating layer 20 of this embodiment contains at least 35.00 to 60.00 mass % Al and 7.00 to 15.00 mass % Mg as the chemical composition, and further, if necessary, contains optional additive elements as described above, and it is even more preferred that an $Mg_{32}(Al, Zn)_{49}$ phase is present in the plating layer 20.

The $Mg_{32}(Al, Zn)_{49}$ phase is defined as a phase in which the Mg content [Mg], Zn content [Zn], and Al content [Al] in grains of the $Mg_{32}(Al, Zn)_{49}$ phase satisfy $0.5 \leq [Mg]/([Zn]+[Al]) \leq 0.83$ by atom %. That is, it is defined as a crystal phase or a quasi-crystalline phase where Mg:(Zn+Al), which is a ratio between Mg atoms and a sum of Zn atoms and Al atoms, is 3:6 to 5:6. The chemical component of the $Mg_{32}(Al, Zn)_{49}$ phase is preferably measured by using TEM-EDX (transmission electron microscope-energy dispersive X-ray spectroscopy). The $Mg_{32}(Al, Zn)_{49}$ phase is sometimes detected as the quasi-crystalline phase in addition to the crystal phase. In the case of the crystal phase, it is possible to identify the crystal structure as the $Mg_{32}(Al, Zn)_{49}$ phase from an electron diffraction image in the TEM observation. When the $Mg_{32}(Al, Zn)_{49}$ phase is the quasi-crystalline phase, it can be confirmed by taking electron diffraction images by TEM and checking whether a five-fold symmetric crystal structure is observed in the electron diffraction image. The five-fold symmetric crystal structure can be determined by obtaining an electron diffraction image called a Penrose pattern.

The $Mg_{32}(Al, Zn)_{49}$ phase achieves sacrificial corrosion resistance to the plated steel sheet, thereby suppressing corrosion of base iron from a cut zone where the base iron is exposed and a weld zone and improving red rust resistance. In addition to these effects, the $Mg_{32}(Al, Zn)_{49}$ phase itself has excellent corrosion resistance, and since a corrosion rate of the $Mg_{32}(Al, Zn)_{49}$ phase is slow even in a corrosive environment, it also has an effect of suppressing under-film corrosion and improving corrosion resistance after coating in terms of coating film blister width.

Adhesion Amount of Plating Layer 20

Although an adhesion amount of the plating layer 20 as explained above is not specified, for example, it is preferably about 15 to 250 g/m² per one side of the steel sheet. When the adhesion amount of the plating layer 20 is within the above-mentioned range, the plated steel sheet 1 of this embodiment can achieve sufficient corrosion resistance.

Such adhesion amount of the plating layer 20 is measured as described below. First, a sample is cut from the plated steel sheet to a size of 30 mm×30 mm, and a mass of the sample is measured beforehand. A tape seal is applied to one side of the sample to prevent the plating layer on this side from dissolving in the next process. The sample is then immersed in a 10% HCl aqueous solution with an inhibitor added, the plating layer is peeled off by pickling, and the mass of the sample after pickling is measured. From a change in the mass of the sample before and after pickling, the adhesion amount of the plating layer 20 per one side can be determined.

<Oxide Layer 30>

Subsequently, the oxide layer 30 held by the plated steel sheet 1 of this embodiment will be described in detail.

As schematically illustrated in FIG. 1A and FIG. 1B, the oxide layer 30 is located on the surface of the plating layer 20 as described above.

The oxide layer 30 is formed when elements that are easily oxidized in the plating layer 20 react with oxygen in a heat treatment atmosphere during a cooling treatment to solidify the plating layer, which is performed when the plated steel sheet is manufactured.

As described above, the oxide layer 30 is mainly composed of oxides of the elements constituting the plating layer 20, and its chemical composition varies depending on the elements contained in the plating layer 20. It is presumed that the oxide layer 30 contains Zn oxide, Mg oxide, and Al oxide in total of 50 mass % or more, and may further contain hydroxides of these Zn, Mg, and Al, at least either of oxides or hydroxides of other constituent elements in the plating layer 20, impurities, and the like.

Figure 2:
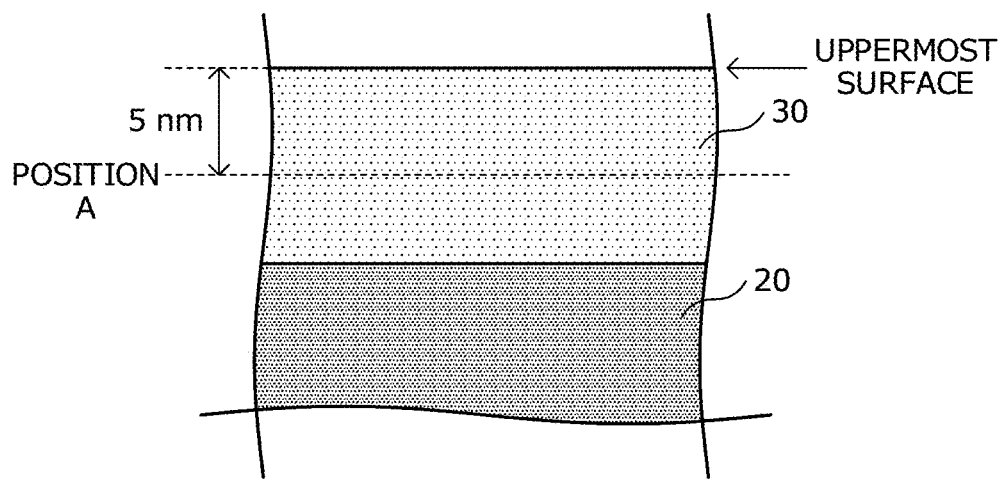
FIG. 2 is an explanatory diagram to explain the plated steel sheet according to the embodiment.
Figure 3:
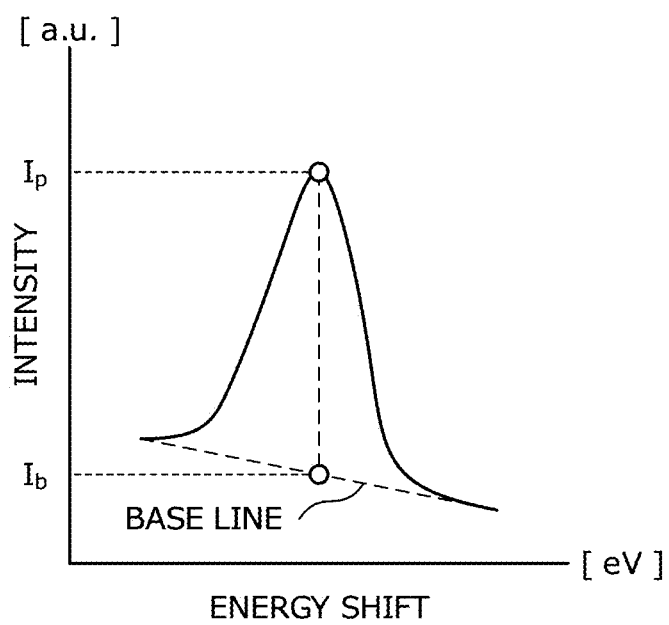
FIG. 3 is an explanatory diagram to explain intensity of peaks in XPS measurement results.

Here, the oxide layer 30 of this embodiment is present in the following specific state, as a result of undergoing a specific heat treatment process, as detailed below, when the plated steel sheet is manufactured. Such a state will be explained in detail below with reference to FIG. 2 and FIG. 3. FIG. 2 is a diagram schematically illustrating a part of a cross-section parallel to a sheet-thickness direction of the oxide layer. FIG. 3 is an explanatory diagram to explain the intensity of peaks in the XPS measurement results.

The oxide layer 30 of this embodiment is manufactured through the specific heat treatment process as detailed below, resulting in a dense state film where a sum of a presence amount of at least either of oxide or hydroxide of Al and a presence amount of at least either of oxide or hydroxide of Mg is greater than a presence amount of at least either of oxide or hydroxide of Zn. The following is a more concrete explanation.

Now, as schematically illustrated in FIG. 2, a position at a depth of 5 nm from an uppermost surface of the oxide layer 30 ("Position A" in FIG. 2) is focused. In the oxide layer 30 of this embodiment, when such a position is observed by X-ray photoelectron spectroscopy (XPS), a value of an intensity ratio calculated from intensity of peaks respectively attributed to an Al—O bond, an Mg—O bond, and a Zn—O bond ([Al—O]+[Mg—O])/[Zn—O] is 5.0 or more.

Here, the uppermost surface of the oxide layer 30 may be contaminated with oil, grease, or other contaminants. Therefore, it is desirable to perform the above XPS measurement in the absence of such contamination, and the like. From this perspective, ultrasonic cleaning in ethanol or other treatments are applied to the surface of the oxide layer 30 to remove contaminants, and the like, and the surface obtained by such treatment is used as the "uppermost surface of the oxide layer 30" for the XPS measurement as described above.

The oxide layer 30 is then removed by Ar ion etching to a depth of 5 nm from the uppermost surface obtained as described above, and the resulting surface of the oxide layer 30 is measured by XPS. Here, XPS measurement conditions can be, for example, as follows.

X-ray source: mono-Al Kα (1486.6 eV)
X-ray diameter: 50 to 200 μm
Measurement area: 100 to 700 μm×100 to 700 μm
Degree of vacuum: $1\times10^{-10}$ to $1\times10^{-11}$ torr (1 torr is 133.32 Pa)
Acceleration voltage: 1 to 10 kV In this embodiment, the peaks respectively attributed to Al—O, Mg—O, and Zn—O bonds are focused in the obtained XPS measurement results. The above bonds are characteristic of oxides and hydroxides of Al, Mg, and Zn. It can be assumed that the intensity of the peaks attributed to these bonds is positively correlated with the presence amount of at least either of the oxides or hydroxides of Al, Mg, and Zn.

The peak attributed to the Al—O bond is the peak observed in a range of 72 to 76 eV in the XPS spectrum focused on Al 2p3/2. The peak attributed to the Mg—O bond is the peak observed in a range of 48 to 52 eV in the XPS spectrum focused on Mg 2p3/2. The peak attributed to the Zn—O bond is the peak observed in a range of 1018 to 1024 eV in the XPS spectrum focused on Zn 2p3/2.

The intensity of the peak attributed to each bond is the intensity where a baseline intensity $I_b$ is subtracted from a peak intensity $I_p$ to be focused (that is, "$I_p-I_b$") in the XPS spectrum as schematically illustrated in FIG. 3, taking into account the baseline of the peak to be focused.

The more detailed method of calculating the intensity ratio is as follows.

That is, XPS is measured as described above at an arbitrary location on a surface corresponding to the position at the depth of 5 nm from the uppermost surface (surface of "position A" in FIG. 2) obtained as described above, and the value of the intensity ratio ([Al—O]+[Mg—O])/[Zn—O]) is calculated. This measurement and calculation process is performed at each of five arbitrary locations on the surface corresponding to "position A", and an average of the five intensity ratios obtained is used as the value of the intensity ratio ([Al—O]+[Mg—O])/[Zn—O] in the oxide layer 30 of this embodiment.

In the oxide layer 30 of this embodiment, the formation of a dense film such that the value of the above intensity ratio is 5.0 or more can suppress the Zn evaporation during welding and the blowhole formation caused by the Zn evaporation. When the value of the above intensity ratio is less than 5.0, the required denseness of the oxide layer 30 is insufficient and the blowhole formation during welding cannot be suppressed. The value of the intensity ratio is preferably 10.0 or more. On the other hand, an upper limit of the value of the intensity ratio ([Al—O]+[Mg—O])/[Zn—O] is not specified, but about 100.0 is a practical upper limit.

A thickness (more precisely, an average thickness) of the oxide layer 30 as explained above is not specified, but it is preferably, for example, approximately in a range of 0.05 to 2.00 μm per one side of the steel sheet. When the thickness of the oxide layer 30 is within the above range, the plated steel sheet 1 of this embodiment can sufficiently suppress the blowhole formation due to the Zn evaporation during welding. The oxide layer 30 with the above thickness can be achieved by controlling a sheet-feeding speed of the steel sheet to an appropriate range while undergoing the heat treatment process as described in detail below.

The thickness of such oxide layer 30 can be measured using XPS. The thickness of the oxide layer is defined as the depth from the surface of the plated steel sheet to a point where a maximum intensity of oxygen becomes 1/20 of a maximum intensity at the uppermost surface, using XPS measurement in a depth direction at a pitch of 1 to 3 nm. The same XPS measurement conditions as above can be used.

The plated steel sheet 1 of this embodiment has been described in detail with reference to FIG. 1A to FIG. 3. The plated steel sheet 1 of this embodiment as explained above can be suitably used, for example, as a material for automobile undercarriage parts.

The plated steel sheet 1 of this embodiment may further include one or two or more various types of films on the oxide layer 30. Such films include, for example, a chromate film, phosphate film, chromate-free film, organic resin film, and other films.

(Manufacturing Method of Plated Steel Sheet)

Next, an example of a manufacturing method of the plated steel sheet as described above will be described.

The plated steel sheet 1 of this embodiment is manufactured by using the steel sheet 10 as described above as a base material and forming the plating layer 20 and oxide layer 30 on the surface of the steel sheet 10.

In addition to the hot-dip plating method, a thermal spraying method, cold spraying method, sputtering method, vapor deposition method, electroplating method, and other methods can be applied to form the plating layer 20. However, the hot-dip plating method is the most preferable in terms of cost to form a plating layer of a thickness generally used in automobiles and other vehicles.

Subsequently, the oxide layer 30 is formed on the surface of the plating layer 20 by applying the specific heat treatment process as described below to the resulting plated steel sheet (steel sheet 10 with plating layer 20). The plated steel sheet 1 of this embodiment is thereby manufactured.

Hereinafter, an example of the manufacturing method for obtaining the plated steel sheet 1 of this embodiment using the hot-dip plating method will be described in detail.

In the manufacturing process for the plated steel sheet 1, first, the steel sheet 10 used as the base material is rolled by a Sendzimir method to a desired thickness, then coiled and installed in a hot-dip plating line.

In the hot-dip plating line, steel sheets are continuously unrolled from coils and fed. At that time, the steel sheets are heated and reduced at 800° C. in an $N_2$-5% $H_2$ gas atmosphere in an annealing facility installed on the line, for example, in an environment with an oxygen concentration of 20 ppm or less to prevent oxidation. Thereafter, the sheets are air-cooled with $N_2$ gas to around a plating bath temperature +20° C., and then immersed in the plating bath at a subsequent stage.

Here, the plating bath should be prepared with a plating alloy in a molten state, having the chemical component as described above. The temperature of the plating bath should be above the melting point of the plating alloy (for example, approximately 460 to 600° C.) or more. When preparing a material for the plating alloy, pure metal (purity of 99% or higher) is preferably used as the alloy material for the preparation. First, a predetermined amount of the alloy metal is mixed to obtain the composition of the plating layer as described above, and completely melted into an alloy using a high-frequency induction furnace, arc furnace, or other furnaces under vacuum or inert gas replacement conditions. Furthermore, the alloy mixed with the predetermined component (composition of the above plating layer) is melted in air, and the resulting melt is used as the plating bath.

There is no particular restriction on using pure metals in the preparation of the plating alloys as described above, and existing Zn alloys, Mg alloys, and Al alloys may be melted and used. In this case, there is no problem as long as a predetermined composition alloy with few impurities is used.

After the steel sheet is immersed in the plating bath as described above, it is pulled up at a predetermined speed. At this time, a plating adhesion amount is controlled by $N_2$ wiping gas, for example, so that the plating layer 20 formed becomes the desired thickness. Other than the bath temperature, general plating operation conditions can be applied, and no special facilities or conditions are required.

Then, first and second cooling processes as described below are performed on the plating alloy in a molten state located on the steel sheet to make the plating alloy in the molten state into the plating layer 20 and to form the oxide layer 30 on the surface of the plating layer 20. The first and second cooling processes are described in detail below.

The first cooling process is a process, which is performed when the temperature of the plating alloy is in a range of the bath temperature or less and 250° C. or more. The plated steel sheet in the above temperature range is rapidly cooled at an average cooling rate of 10° C./second or more in an atmosphere with a dew point of −20° C. or less. When the hot-dip plating method is employed in the plating process, the first cooling process is performed immediately after the steel sheet is pulled up from the plating bath. This causes the plating alloy located on the surface of the steel sheet to solidify to form the plating layer.

Thereafter, when the temperature of the plating alloy (plating layer) is within a range of less than 250° C. and 50° C. or more, the second cooling process is performed. This second cooling process is a process in which the plated steel sheet within the temperature range of less than 250° C. and 50° C. or more is slowly cooled at an average cooling rate of less than 10° C./second in an atmosphere with a dew point of 0° C. or more. This controls a state of oxides formed on the surface of the plating layer to form a desired oxide layer.

As described above, the two-step cooling process of rapid cooling in the temperature range of the bath temperature or less and 250° C. or more and slow cooling in the temperature range of less than 250° C. and 50° C. or more allows the formation of the dense oxide layer 30 on the surface of the plating layer 20, which satisfies certain conditions in the XPS measurement result.

Here, an interval between an end of the first cooling process and a start of the second cooling process is preferably within 3 seconds, and the second cooling process is preferably started immediately after the end of the first cooling process. When the interval between the end of the first cooling process and the start of the second cooling process exceeds 3 seconds, an unintended cooling process occurs and the desired oxide layer 30 cannot be obtained.

Here, a lower limit value of the dew point is not specified in the above first cooling process, but approximately −90° C., for example, is the practical lower limit. The average cooling rate is more preferably 40° C./second or more. An upper limit value of the average cooling rate is not specified, but for example, approximately 90° C./second is the practical upper limit.

In the above second cooling process, an upper limit value of the dew point is not specified, but approximately 20° C., for example, is the practical upper limit. The average cooling rate is more preferably 4° C./second or less.

When either the first or second cooling process as described above is not performed, the desired oxide layer 30 cannot be obtained. By applying both the first and second cooling processes as described above, the oxide layer 30 of this embodiment can be obtained.

When an alloying heat treatment process (for example, a heat treatment process involving heating to an attained sheet temperature of approximately 480 to 550° C.), which is generally applied in the manufacture of alloyed hot-dip galvanized steel sheets, is applied after the second cooling process described above, an oxide formation state controlled by the first and second cooling processes is disrupted, resulting in excessive oxide growth. As a result, the Zn evaporation suppression effect focused on in this embodiment cannot be obtained. From this perspective, it is important not to perform the heat treatment process after the second cooling process.

For the above cooling treatment, generally known methods such as $N_2$ gas cooling, mist cooling, water submergence, and other methods can be applied. In addition to $N_2$ gas, other gases with high heat removal effects such as He gas and hydrogen gas may be used as the cooling gas.

For example, a contact-type thermocouple (K-type) can be used to actually measure the temperature of the plating layer. By attaching the contact-type thermocouple to the base material steel sheet, the average temperature of an entire plating layer can be constantly monitored. Also, by mechanically controlling various speeds and thicknesses, and by standardizing various operating conditions such as a preheating temperature of the steel sheet and the temperature of the hot-dip plating bath, the temperature of the entire plating layer at that point under such manufacturing conditions can be monitored almost accurately. This makes it possible to precisely control the cooling treatment in the first and second cooling processes. The surface temperature of the plating layer can also be measured by a non-contact radiation thermometer, although this is not as accurate as the contact type.

A relationship between the surface temperature of the plating layer and the average temperature of the entire plating layer may be determined by a simulation that performs heat conduction analysis. Concretely, the surface temperature of the plating layer and the average temperature of the entire plating layer are determined based on various manufacturing conditions, such as the preheating temperature of the steel sheet, the temperature of the hot-dip plating bath, the pulling-up speed of the steel sheet from the plating bath, the sheet thickness of the steel sheet, the layer thickness of the plating layer, an amount of heat exchange between the plating layer and the manufacturing facility, and a heat release amount of the plating layer. The obtained results can then be used to determine the relationship between the surface temperature of the plating layer and the average temperature of the entire plating layer. This makes it possible to estimate the average temperature of the entire plating layer at that time under the manufacturing conditions by actually measuring the surface temperature of the plating layer during the manufacturing of the plated steel sheet. As a result, the cooling treatment in the first and second cooling processes can be precisely controlled.

The above is the concrete description of the example of the manufacturing method for the plated steel sheet of this embodiment.

In the manufacturing method for the plated steel sheet of this embodiment, a further treatment to form one or two or more layers of various types of films may be implemented after the second cooling process described above. Such treatments include, for example, chromate treatment, phosphate treatment, chromate-free treatment, organic resin film formation treatment, and other treatments.

Examples of the chromate treatment include electrolytic chromate treatment, which forms a chromate film by electrolysis, reactive chromate treatment, which forms a film by reaction with a material and then washes off excess treatment solution, and coating-type chromate treatment, which forms a film by applying a treatment solution and drying it without water washing, and other treatments. Any of these chromate treatments may be used.

Examples of the electrolytic chromate treatment include the electrolytic chromate treatment using, for example, chromic acid, silica sol, resin (phosphoric acid resin, acrylic resin, vinylester resin, vinyl acetate acrylic emulsion, carboxylated styrene butadiene latex, diisopropanolamine modified epoxy resin, and the like), and hard silica.

Examples of the phosphate treatment include, for example, zinc phosphate treatment, calcium zinc phosphate treatment, manganese phosphate treatment, and other treatments.

The chromate-free treatment is particularly suitable because it does not place a burden on the environment. Such chromate-free treatment includes electrolytic chromate-free treatment, which forms a chromate-free film by electrolysis, reactive chromate-free treatment, which forms a film by reaction with a material and then washes off excess treatment solution, and coating-type chromate-free treatment, which forms a film by applying a treatment solution and drying it without water washing, and other treatments. Any of these chromate-free treatments may be used.

The organic resins used in the organic resin film formation treatment are not limited to specific resins. For example, various resins such as polyester resins, polyurethane resins, epoxy resins, acrylic resins, polyolefin resins, and modified versions of these resins can be used. The term "modified resins" refers to resins in which reactive functional groups in a structure of these resins are reacted with other compounds (for example, monomers, crosslinking agents, or other compounds) that contain functional groups, which can react with such functional groups, in the structure.

One of the above-mentioned organic resins may be used alone, or a mixture of two or more organic resins (not modified) may be used. One or two or more organic resins obtained by modifying at least one other organic resin in the presence of at least one organic resin may also be used in a mixture. In addition, an organic resin that has been made aqueous by dissolving or dispersing it in water may be used. Furthermore, various kinds of coloring pigments and anti-corrosion pigments may be contained in such organic resin films.

EXAMPLES

Hereinafter, the plated steel sheet according to the present invention will be concretely explained by showing examples and comparative examples. The examples shown below are only one example of the plated steel sheet of this invention, and the plated steel sheet of this invention is not limited to the examples shown below.

In the following examples and comparative examples, a hot-rolled steel sheet (0.05 mass % C-0.007 mass % Si-0.25 mass % Mn, manufactured by Nippon Steel Corporation) of 3.2 mm thickness was used as the base material. The hot-rolled steel sheet was cut into a size of 100 mm×200 mm to be used as a specimen.

Plating baths to obtain plating layers with compositions as listed in Table 1 below were each prepared, and each was installed in a batch-type hot-dip plating test apparatus manufactured in-house, and the above specimens were plated. Here, the temperature of each specimen was measured using a thermocouple spot-welded to the center of each specimen. For each specimen to be immersed in the plating bath, a surface of a plated substrate was subjected to a heat-reduction treatment at 800° C. in an $N_2$-5% $H_2$ gas atmosphere in a furnace with the oxygen concentration of 20 ppm or less before immersion in the plating bath. After the heat-reduction treatment, each specimen was air-cooled with $N_2$ gas and immersed in the plating bath of the hot-dip plating test apparatus for about 3 seconds after the temperature of the specimen reached the bath temperature +20° C.

After the immersion in the plating bath, the specimen was pulled up at a pulling-up speed of 20 to 200 mm/second. At the time of pulling-up, $N_2$ wiping gas was used to control a desired plating adhesion amount. In the following examples and comparative examples, the plating adhesion amount was controlled so that the adhesion amount of the plating layer after drying per one side of the specimen was 15 to 250 g/m². After pulling up the specimen from the plating bath, the specimen was cooled from the plating bath temperature to room temperature under the conditions listed in Table 1 below. In the following examples and comparative examples, the second cooling process was started immediately after the end of the first cooling process (that is, the interval between the end of the first cooling process and the start of the second cooling process was 0.2 seconds or less). For comparison, an example in which an alloying treatment at an attained sheet temperature of 500° C.×holding time of 15 seconds was applied to the specimen after the second cooling process was also prepared (No. 44 in Table 1).

The plated steel sheet was cut into a size of 30 mm×30 mm from the specimen plated as described above. The plated steel sheet was then immersed in a 10% HCl aqueous solution with an inhibitor added, and the plating layer was pickled and peeled off. The composition of the plating layer was measured by ICP analysis of the elements dissolved in the aqueous solution.

Electron diffraction images were taken of the obtained plating layer by TEM, and the presence of the $Mg_{32}(Al, Zn)_{49}$ phase was confirmed based on whether a five-fold symmetrical crystal structure was observed in the electron diffraction images.

Furthermore, the XPS spectrum of the obtained oxide layer was measured in accordance with the method described above, and the value of the intensity ratio ([Al—O]+[Mg—O])/[Zn—O] was calculated. The obtained intensity ratios were evaluated based on the following criteria.

Evaluation Criteria

Grade "A": Value of intensity ratio of 10.0 or more
"B": Value of intensity ratio of 5.0 or more and less than 10.0
"C": Value of intensity ratio of less than 5.0

Each of the obtained specimens was evaluated in terms of blowhole formation during welding, LME generation during welding, and corrosion resistance.

<Evaluation of Blowhole Formation During Welding>

From the obtained specimen, a first steel sheet was cut into a size of 150 mm×50 mm, and a second steel sheet was cut into a size of 150 mm×30 mm. Long sides of these steel sheets were overlapped and welded by arc welding or laser welding (lap fillet welding).

Here, welding conditions for the arc welding are as follows.

Welding current: 220 A, welding voltage: 25.2 V, welding speed: 100 cm/min.
Welding gas: 20% $CO_2$+Ar, gas flow rate: 20 L/min.
Welding wire: YGW16, φ1.2 mm, manufactured by Nippon Steel Welding & Engineering Co., Ltd.
(C: 0.1 Mass %, Si: 0.80 Mass %, Mn: 1.5 Mass %, P: 0.015 Mass %, S: 0.008 Mass %, Cu: 0.36 Mass %)
Inclination angle of welding torch: 45°
Overlap allowance: 10 mm
Steel sheet size: Upper sheet side (first steel sheet)150×50 mm, lower sheet side (second steel sheet) 150×30 mm
Gap between steel sheets: 0 mm Welding conditions for the laser welding are as follows.

Output: 7 kW, welding speed: 400 cm/min, forward/backward angle: 0°
Steel sheet size: Upper sheet side (first steel sheet) 150×50 mm, lower sheet side (second steel sheet) 150×30 mm
Overlap allowance: 50 mm
Gap between steel sheets: 0 mm The presence or absence of blowholes that may be formed during welding can be easily determined by conducting an X-ray transmission test on the specimen after welding from above the specimen. In this example, after welding as described above, the X-ray transmission test was conducted on an area including a weld bead zone generated by welding and a toe, and a projected area of each portion was calculated by identifying a portion where blowholes were formed and a portion where no blowholes were formed. Concretely, model number: SMART300HP manufactured by YXLON was used as a device. After fixing the specimen to a base, an X-ray inspection device was set so that a focal distance was 750 mm from a tip of an irradiation port, and X-rays were irradiated from an angle inclined at 60° to an evaluation surface. The applied current was 3 mA, the applied voltage was 125 kV, and the applied time was 1 minute. The projected area of the portion where blowholes were formed was divided by the total projected area to calculate a blowhole occupancy ratio (%)={(projected area of the portion where blowholes were formed/total projected area)×100}, and evaluation was made based on the following criteria.

Evaluation Criteria

Grade "AAA": Blowhole occupancy ratio of less than 5%
"AA": Blowhole occupancy ratio of 5% or more and less than 10%
"A": Blowhole occupancy ratio of 10% or more and less than 20%
"B": Blowhole occupancy ratio of 20% or more The above "toe" is a location specified in JIS Z3001 (2018) and corresponds to a point where a surface of the base material and a surface of the weld bead intersect. In this example, a point where the surface of the oxide layer and the surface of the weld bead in the plated steel sheet intersect corresponds to this "toe".

<Evaluation of LME Resistance>

The LME resistance of the obtained specimen was evaluated by a hot tensile test.

More precisely, both the obtained specimen and an unplated steel sheet were heated up to 800° C. at a heating rate of 100° C./second, held at 800° C. for 1 second, and then subjected to the tensile test at a stroke speed of 50 mm/second. Stress-stroke curves were thus obtained for both the unplated steel sheet and the specimen. A stress×stroke value (area of the stress-stroke curve) was then calculated from the obtained stress-stroke curves, respectively, and an evaluation value (%)={(stress×stroke value of the specimen)/(stress×stroke value of the unplated steel sheet)×100} was evaluated based on the following evaluation criteria.

Evaluation Criteria

Grade "AA": Evaluation value of 95% or more
"A": Evaluation value of 85% or more and less than 95%
"B": Evaluation value of less than 85%

<Evaluation of Corrosion Resistance>

The obtained specimens were evaluated for corrosion resistance as follows.

Namely, a 50×100 mm sample was taken from the plated steel sheet and treated with Zn phosphoric acid (SD5350 System: Nippon Paint Industrial Coding Co. Ltd. standard). Then, electrodeposition coating (PN110 Power Nix Gray: Nippon Paint Industrial Coding Co., Ltd. standard) was applied to a thickness of 15 µm and baked at a baking temperature of 150° C. for 20 minutes. After introducing a 70 mm long scribe in this coated plated steel sheet (plated steel sheet with electrodeposition coating) using a cutter to reach the base iron, the sheet was subjected to a combined cyclic corrosion test according to JASO (M609-91), and a maximum one-sided blister width from the cut portion was measured to evaluate post-coating corrosion resistance.

Evaluation Criteria

Grade "AAA": less than 1 mm
"AA": 1 mm or more and less than 2 mm
"A": 2 mm or more and less than 3 mm
"B": 3 mm or more The results obtained are summarized in Table 1 below.

TABLE 1

| | | PLATING LAYER COMPOSITION (mass %) | | | | | | | MANUFACTURING CONDITION | | | |
| | | | | | | | | | PLATING BATH TEMPERATURE (° C.) | FIRST COOLING PROCESS | | SECOND COOLING PROCESS |
| | | | | | | | OTHER ELEMENTS | | | COOLING RATE (° C./s) | DEW POINT (° C.) | COOLING RATE (° C./s) |
| No | CATEGORY | Zn | Al | Mg | Si | Ca | Fe | TOTAL | KIND | | | | |
| 1 | EXAMPLE | 97.90 | 1.00 | 1.00 | 0.00 | 0.00 | 0.10 | — | — | 450 | 15 | −40 | 5 |
| 2 | EXAMPLE | 96.59 | 1.80 | 1.50 | 0.00 | 0.00 | 0.10 | 0.010 | Co | 450 | 15 | −40 | 5 |
| 3 | EXAMPLE | 95.20 | 2.20 | 2.50 | 0.00 | 0.00 | 0.10 | 0.001 | Li | 450 | 15 | −40 | 5 |
| 4 | EXAMPLE | 94.90 | 3.00 | 2.00 | 0.00 | 0.00 | 0.10 | — | — | 420 | 15 | −40 | 5 |
| 5 | EXAMPLE | 90.82 | 6.00 | 3.00 | 0.00 | 0.00 | 0.10 | 0.080 | Sb | 430 | 15 | −40 | 5 |
| 6 | EXAMPLE | 85.30 | 11.00 | 3.40 | 0.15 | 0.00 | 0.10 | 0.050 | Sr | 450 | 15 | −40 | 5 |
| 7 | EXAMPLE | 82.30 | 11.50 | 6.00 | 0.00 | 0.10 | 0.10 | — | — | 500 | 15 | −40 | 5 |
| 8 | EXAMPLE | 75.78 | 18.00 | 6.00 | 0.00 | 0.10 | 0.10 | 0.020 | Pb | 500 | 15 | −40 | 5 |
| 9 | EXAMPLE | 73.49 | 19.60 | 6.60 | 0.00 | 0.10 | 0.20 | 0.010 | Sn | 500 | 15 | −40 | 5 |
| 10 | EXAMPLE | 72.60 | 20.00 | 7.20 | 0.00 | 0.10 | 0.10 | 0.005 | V | 500 | 15 | −40 | 5 |
| 11 | EXAMPLE | 71.20 | 25.40 | 3.20 | 0.00 | 0.10 | 0.10 | 0.003 | B | 540 | 15 | −40 | 5 |
| 12 | EXAMPLE | 64.98 | 25.10 | 9.00 | 0.00 | 0.60 | 0.30 | 0.020 | Nb | 540 | 15 | −40 | 5 |
| 13 | EXAMPLE | 60.40 | 29.90 | 8.00 | 0.00 | 0.20 | 1.50 | — | — | 570 | 15 | −40 | 5 |
| 14 | EXAMPLE | 64.20 | 30.10 | 3.30 | 0.00 | 0.00 | 2.40 | — | — | 540 | 15 | −40 | 5 |
| 15 | EXAMPLE | 50.00 | 35.70 | 10.00 | 0.00 | 0.70 | 3.40 | 0.200 | Cu | 560 | 15 | −40 | 5 |
| 16 | EXAMPLE | 49.49 | 35.80 | 9.20 | 0.20 | 0.50 | 4.80 | 0.010 | Ti | 560 | 15 | −40 | 5 |
| 17 | EXAMPLE | 55.09 | 35.80 | 3.50 | 0.30 | 0.50 | 4.80 | 0.010 | Zr | 560 | 15 | −40 | 5 |
| 18 | EXAMPLE | 42.20 | 40.00 | 11.20 | 0.50 | 1.00 | 5.10 | — | — | 570 | 15 | −40 | 5 |
| 19 | EXAMPLE | 34.89 | 40.30 | 15.60 | 1.20 | 2.50 | 5.50 | 0.010 | In | 580 | 15 | −40 | 5 |
| 20 | EXAMPLE | 36.50 | 45.00 | 11.90 | 0.50 | 1.00 | 5.10 | 0.001 | Ag | 580 | 15 | −40 | 5 |
| 21 | EXAMPLE | 40.50 | 46.00 | 6.40 | 0.00 | 0.00 | 7.10 | 0.005 | Bi | 580 | 15 | −40 | 5 |
| 22 | EXAMPLE | 25.20 | 47.00 | 20.00 | 0.70 | 4.00 | 3.10 | 0.001 | Ni | 640 | 15 | −40 | 5 |
| 23 | EXAMPLE | 34.80 | 50.40 | 8.60 | 0.90 | 0.80 | 4.50 | — | — | 600 | 15 | −40 | 5 |
| 24 | EXAMPLE | 30.78 | 54.10 | 8.00 | 1.20 | 0.50 | 5.40 | 0.020 | Y | 600 | 15 | −40 | 5 |
| 25 | EXAMPLE | 33.10 | 58.00 | 3.10 | 1.50 | 0.10 | 4.20 | — | — | 620 | 15 | −40 | 5 |
| 26 | EXAMPLE | 24.25 | 60.40 | 7.30 | 2.00 | 0.60 | 5.40 | 0.050 | Cr | 650 | 15 | −40 | 5 |

TABLE 1-continued

| No | | | | | | | | | | | | |
|---|---|---|---|---|---|---|---|---|---|---|---|---|
| 27 | EXAMPLE | 10.00 | 65.80 | 11.00 | 6.00 | 0.70 | 6.50 | — | — | 660 | 15 | −40 | 5 |
| 28 | EXAMPLE | 71.69 | 70.4 | 8.90 | 10.00 | 0.70 | 8.70 | 0.010 | Mn | 660 | 15 | −40 | 5 |
| 29 | EXAMPLE | 5.98 | 74.90 | 8.10 | 3.50 | 0.70 | 6.80 | 0.020 | La:Ce = 1:1 | 670 | 15 | −40 | 5 |
| 30 | EXAMPLE | 5.50 | 74.30 | 5.10 | 7.40 | 0.60 | 7.10 | — | — | 670 | 15 | −40 | 5 |
| 31 | EXAMPLE | 5.99 | 74.40 | 4.00 | 0.20 | 0.40 | 15.00 | 0.010 | Mo | 680 | 15 | −40 | 5 |
| 32 | EXAMPLE | 5.00 | 80.00 | 4.00 | 2.20 | 0.40 | 8.40 | | | 680 | 15 | −40 | 5 |
| 33 | COMPARATIVE EXAMPLE | 97.90 | 0.50 | 1.50 | 0.00 | 0.00 | 0.10 | — | — | 450 | 15 | −40 | 5 |
| 34 | COMPARATIVE EXAMPLE | 2.90 | 81.00 | 7.20 | 0.00 | 0.10 | 8.80 | — | — | 680 | 15 | −40 | 5 |
| 35 | COMPARATIVE EXAMPLE | 53.30 | 40.00 | 0.60 | 0.00 | 1.00 | 5.10 | — | — | 570 | 15 | −40 | 5 |
| 36 | COMPARATIVE EXAMPLE | 70.40 | 2.00 | 21.50 | 0.00 | 1.00 | 5.10 | — | — | 580 | 15 | −40 | 5 |
| 37 | COMPARATIVE EXAMPLE | 5.50 | 70.00 | 8.60 | 11.20 | 0.20 | 4.50 | — | — | 700 | 15 | −40 | 5 |
| 38 | COMPARATIVE EXAMPLE | 11.00 | 74.90 | 2.80 | 0.00 | 4.50 | 6.80 | — | — | 670 | 15 | −40 | 5 |
| 39 | COMPARATIVE EXAMPLE | 30.90 | 50.40 | 8.60 | 0.00 | 0.20 | 4.50 | 5.400 | Mn | 600 | 15 | −40 | 5 |
| 40 | COMPARATIVE EXAMPLE | 90.20 | 1.40 | 1.60 | 0.00 | 0.00 | 6.80 | — | — | 670 | 5 | −40 | 5 |
| 41 | COMPARATIVE EXAMPLE | 93.80 | 3.00 | 3.00 | 0.00 | 0.10 | 0.10 | — | — | 500 | 15 | 0 | 5 |
| 42 | COMPARATIVE EXAMPLE | 90.40 | 2.20 | 1.30 | 0.00 | 1.00 | 5.10 | — | — | 570 | 15 | −40 | 15 |
| 43 | COMPARATIVE EXAMPLE | 95.80 | 4.00 | 2.1 | 0.00 | 0.10 | 0.10 | — | — | 500 | 15 | −40 | 5 |
| 44 | COMPARATIVE EXAMPLE | 42.20 | 40.00 | 11.20 | 0.50 | 1.00 | 5.10 | — | — | 570 | 15 | −40 | 5 |

| | MANUFACTURING CONDITION | | | PRESENCE/ | | | | |
|---|---|---|---|---|---|---|---|---|
| | SECOND COOLING PROCESS | | | ABSENCE OF $Mg_{32}(Al, Zn)_{49}$ PHASE IN | OXIDE LAYER | | PERFORMANCE | |
| No | DEW POINT (° C.) | ALLOYING TREATMENT | ADHESION AMOUNT (g/m²) | PLATING LAYER | XPS INTENSITY RATIO | WELDING METHOD | BLOW HOLE | LME | CORROSION RESISTANCE |
| 1 | 0 | NONE | 45 | ABSENT | B | ARC | A | A | A |
| 2 | 0 | NONE | 55 | ABSENT | B | ARC | A | A | A |
| 3 | 0 | NONE | 45 | ABSENT | B | ARC | A | A | A |
| 4 | 0 | NONE | 15 | ABSENT | B | ARC | A | A | A |
| 5 | 0 | NONE | 45 | ABSENT | B | ARC | A | A | A |
| 6 | 0 | NONE | 45 | ABSENT | B | LASER | A | A | A |
| 7 | 0 | NONE | 50 | ABSENT | B | ARC | A | A | A |
| 8 | 0 | NONE | 45 | ABSENT | A | ARC | AA | A | AA |
| 9 | 0 | NONE | 60 | ABSENT | A | ARC | AA | A | AA |
| 10 | 0 | NONE | 45 | ABSENT | A | ARC | AA | A | AA |
| 11 | 0 | NONE | 45 | ABSENT | B | LASER | A | A | A |
| 12 | 0 | NONE | 45 | ABSENT | A | ARC | AA | A | AA |
| 13 | 0 | NONE | 45 | ABSENT | A | ARC | AA | A | AA |
| 14 | 10 | NONE | 60 | ABSENT | B | ARC | A | AA | A |
| 15 | 0 | NONE | 250 | PRESENT | A | ARC | AAA | AA | AAA |
| 16 | 0 | NONE | 55 | PRESENT | A | ARC | AAA | AA | AAA |
| 17 | 0 | NONE | 45 | ABSENT | B | ARC | A | A | A |
| 18 | 0 | NONE | 170 | PRESENT | A | ARC | AAA | AA | AAA |
| 19 | 0 | NONE | 45 | PRESENT | A | ARC | AAA | AA | AAA |
| 20 | 0 | NONE | 120 | PRESENT | A | ARC | AAA | AA | AAA |
| 21 | 0 | NONE | 80 | ABSENT | A | ARC | AA | A | AA |
| 22 | 0 | NONE | 45 | PRESENT | A | LASER | AAA | AA | AAA |
| 23 | 0 | NONE | 110 | PRESENT | A | ARC | AAA | AA | AAA |
| 24 | 0 | NONE | 90 | PRESENT | A | ARC | AAA | AA | AAA |
| 25 | 0 | NONE | 45 | ABSENT | A | ARC | AA | A | AA |
| 26 | 0 | NONE | 45 | PRESENT | A | ARC | AAA | AA | AAA |
| 27 | 0 | NONE | 80 | PRESENT | A | ARC | AAA | AA | AAA |
| 28 | 0 | NONE | 45 | ABSENT | A | ARC | A | A | A |
| 29 | 0 | NONE | 45 | ABSENT | A | ARC | A | A | A |
| 30 | 0 | NONE | 25 | ABSENT | A | ARC | A | A | A |
| 31 | 0 | NONE | 45 | ABSENT | A | ARC | A | A | A |
| 32 | 0 | NONE | 45 | ABSENT | A | ARC | A | A | A |
| 33 | 0 | NONE | 45 | ABSENT | C | ARC | B | B | B |
| 34 | 0 | NONE | 55 | ABSENT | A | ARC | AA | A | B |
| 35 | 0 | NONE | 45 | ABSENT | C | ARC | B | B | B |
| 36 | 0 | NONE | 45 | ABSENT | A | ARC | AA | B | B |
| 37 | 0 | NONE | 65 | ABSENT | C | ARC | B | B | B |
| 38 | 0 | NONE | 45 | ABSENT | C | ARC | B | B | B |
| 39 | 0 | NONE | 45 | PRESENT | C | ARC | B | B | B |

TABLE 1-continued

| | | | | | | | | | |
|---|---|---|---|---|---|---|---|---|---|
| 40 | 0 | NONE | 45 | ABSENT | C | ARC | B | B | B |
| 41 | 0 | NONE | 45 | ABSENT | C | ARC | B | B | B |
| 42 | 0 | NONE | 45 | PRESENT | C | ARC | B | B | B |
| 43 | −40 | NONE | 60 | ABSENT | C | ARC | B | B | B |
| 44 | 0 | DONE | 60 | PRESENT | C | ARC | B | B | B |

As it is clear from Table 1 above, examples corresponding to the examples of the present invention are able to suppress the blowhole formation and LME while maintaining excellent corrosion resistance, whereas examples corresponding to the comparative examples of the present invention are not able to achieve sufficient performance in at least any of the corrosion resistance, blowhole formation, and LME.

Preferred embodiments of the present invention have been described above in detail with reference to the attached drawings, but the present invention is not limited to the embodiments. It should be understood that various changes and modifications are readily apparent to those skilled in the art who have the common general knowledge in the technical field to which the present invention pertains, within the scope of the technical spirit as set forth in claims, and they should also be covered by the technical scope of the present invention.

EXPLANATION OF CODES 1 plated steel sheet
10 steel sheet
20 plating layer
30 oxide layer

What is claimed is:

1. A plated steel sheet, comprising:
a steel sheet as a base material;
a plating layer located on at least part of a surface of the steel sheet; and
an oxide layer located on a surface of the plating layer, wherein
the plating layer contains: by mass %,
Al: 1.00 to 80.00%;
Mg: 1.00 to 20.00%;
Fe: 0.01 to 15.00%;
Si: 0 to 10.00%;
Ca: 0 to 4.00%, and further selectively contains 0 to 5.000% in total of:
Sb: 0 to 0.500%;
Pb: 0 to 0.500%;
Cu: 0 to 1.000%;
Sn: 0 to 1.000%;
In: 0 to 1.000%;
Bi: 0 to 1.000%;
Ti: 0 to 1.000%;
Cr: 0 to 1.000%;
Nb: 0 to 1.000%;
Zr: 0 to 1.000%;
Ni: 0 to 1.000%;
Mn: 0 to 1.000%;
V: 0 to 1.000%;
Mo: 0 to 1.000%;
Ag: 0 to 1.000%;
Li: 0 to 1.000%;
La: 0 to 0.500%;
Ce: 0 to 0.500%;
B: 0 to 0.500%;
Y: 0 to 0.500%;
Sr: 0 to 0.500%, with the balance composed of 5.00 mass % or more Zn and impurities, and
when a position at a depth of 5 nm from an uppermost surface of the oxide layer is observed by X-ray photoelectron spectroscopy (XPS), a value of an intensity ratio ([Al—O]+[Mg—O])/[Zn—O]) calculated from intensity of peaks respectively attributed to an Al—O bond, an Mg—O bond, and a Zn—O bond is 5.0 or more.

2. The plated steel sheet according to claim 1, wherein the value of the intensity ratio ([Al—O]+[Mg—O])/[Zn—O] is 10.0 or more.

3. The plated steel sheet according to claim 1, wherein the plating layer contains at least
Al: 18.00 to 60.00 mass % and
Mg: 5.00 to 15.00 mass %.

4. The plated steel sheet according to claim 2, wherein the plating layer contains at least
Al: 18.00 to 60.00 mass % and
Mg: 5.00 to 15.00 mass %.

5. The plated steel sheet according to claim 1, wherein the plating layer contains at least
Al: 35.00 to 60.00 mass % and
Mg: 7.00 to 15.00 mass %, and
an $Mg_{32}(Al, Zn)_{49}$ phase is present in the plating layer, and
the Mg content [Mg], Zn content [Zn], and Al content [Al] (each unit: atom %) in the $Mg_{32}(Al, Zn)_{49}$ phase satisfy the relationship of $0.50 \leq [Mg]/([Zn]+[Al]) \leq 0.83$.

6. The plated steel sheet according to claim 2, wherein the plating layer contains at least
Al: 35.00 to 60.00 mass % and
Mg: 7.00 to 15.00 mass %, and
an $Mg_{32}(Al, Zn)_{49}$ phase is present in the plating layer, and
the Mg content [Mg], Zn content [Zn], and Al content [Al] (each unit: atom %) in the $Mg_{32}(Al, Zn)_{49}$ phase satisfy the relationship of $0.50 \leq [Mg]/([Zn]+[Al]) \leq 0.83$.

7. The plated steel sheet according to claim 3, wherein the plating layer contains at least
Al: 35.00 to 60.00 mass % and
Mg: 7.00 to 15.00 mass %, and
an $Mg_{32}(Al, Zn)_{49}$ phase is present in the plating layer, and
the Mg content [Mg], Zn content [Zn], and Al content [Al] (each unit: atom %) in
the $Mg_{32}(Al, Zn)_{49}$ phase satisfy the relationship of $0.50 \leq [Mg]/([Zn]+[Al]) \leq 0.83$.

8. The plated steel sheet according to claim 4, wherein the plating layer contains at least
Al: 35.00 to 60.00 mass % and
Mg: 7.00 to 15.00 mass %, and
an $Mg_{32}(Al, Zn)_{49}$ phase is present in the plating layer, and
the Mg content [Mg], Zn content [Zn], and Al content [Al] (each unit: atom %) in
the $Mg_{32}(Al, Zn)_{49}$ phase satisfy the relationship of $0.50 \leq [Mg]/([Zn]+[Al]) \leq 0.83$.

9. A plated steel sheet, comprising:
a steel sheet as a base material;
a plating layer located on at least part of a surface of the steel sheet; and
an oxide layer located on a surface of the plating layer, wherein
the plating layer contains: by mass %,
Al: 1.00 to 80.00%;
Mg: 1.00 to 20.00%;
Fe: 0.01 to 15.00%;
Si: 0 to 10.00%;
Ca: 0 to 4.00%, and further selectively contains 0 to 5.000% in total of:
Sb: 0 to 0.500%;
Pb: 0 to 0.500%;
Cu: 0 to 1.000%;
Sn: 0 to 1.000%;
In: 0 to 1.000%;
Bi: 0 to 1.000%;
Ti: 0 to 1.000%;
Cr: 0 to 1.000%;
Nb: 0 to 1.000%;
Zr: 0 to 1.000%;
Ni: 0 to 1.000%;
Mn: 0 to 1.000%;
V: 0 to 1.000%;
Mo: 0 to 1.000%;
Ag: 0 to 1.000%;
Li: 0 to 1.000%;
La: 0 to 0.500%;
Ce: 0 to 0.500%;
B: 0 to 0.500%;
Y: 0 to 0.500%;
Sr: 0 to 0.500%, with the balance comprising 5.00 mass % or more Zn and impurities, and
when a position at a depth of 5 nm from an uppermost surface of the oxide layer is observed by X-ray photoelectron spectroscopy (XPS), a value of an intensity ratio ([Al—O]+[Mg—O])/[Zn—O]) calculated from intensity of peaks respectively attributed to an Al—O bond, an Mg—O bond, and a Zn—O bond is 5.0 or more.

* * * * *